Apr. 3, 1923.
J. W. BUCK
MECHANICAL BIRD
Original Filed Oct. 23, 1918     5 sheets-sheet 1
1,450,480
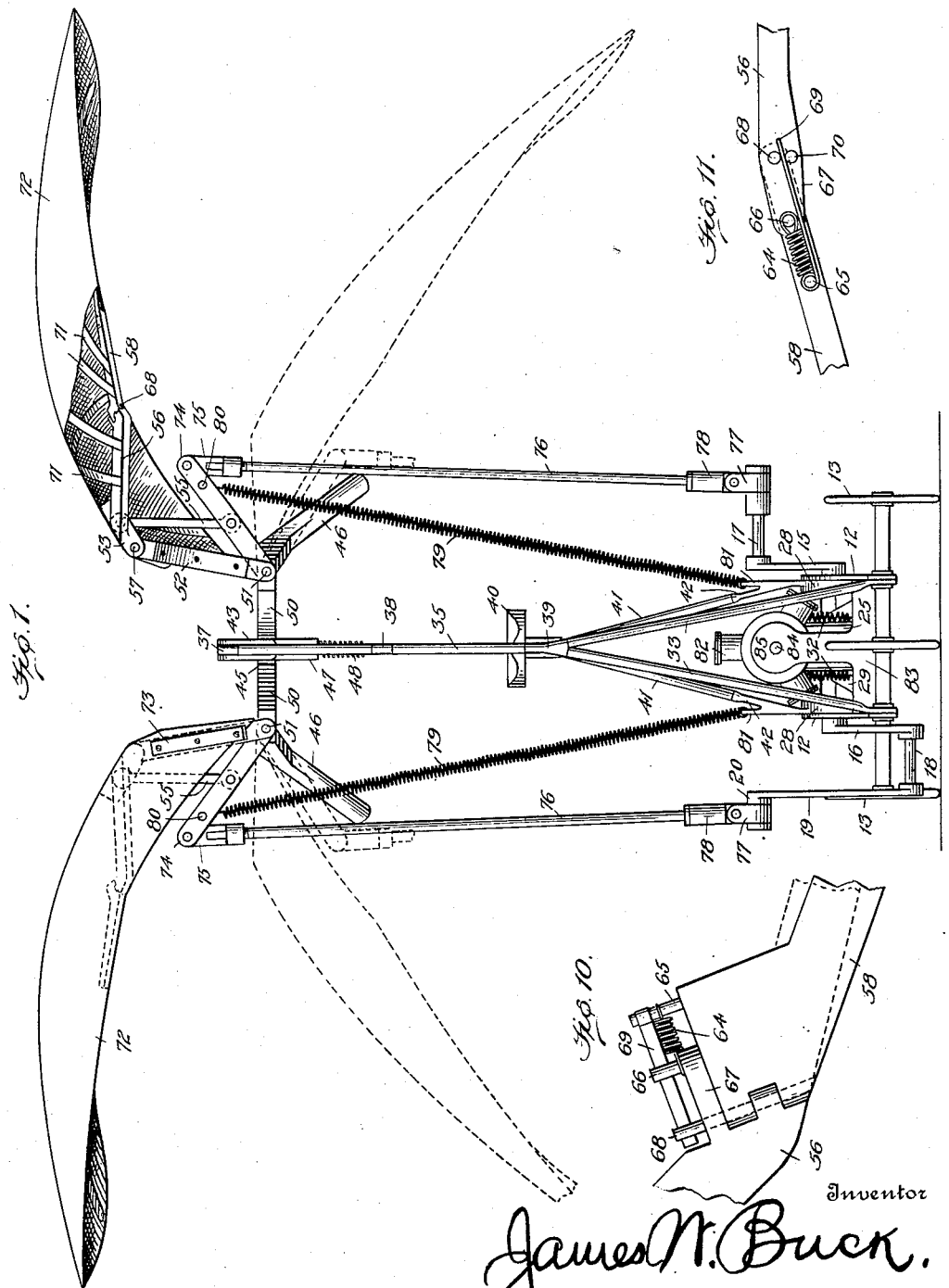
Witness
Edwin L. Bradford
Inventor
James W. Buck.

Apr. 3, 1923.
J. W. BUCK
1,450,480
MECHANICAL BIRD
Original Filed Oct. 23, 1918   5 sheets-sheet 2
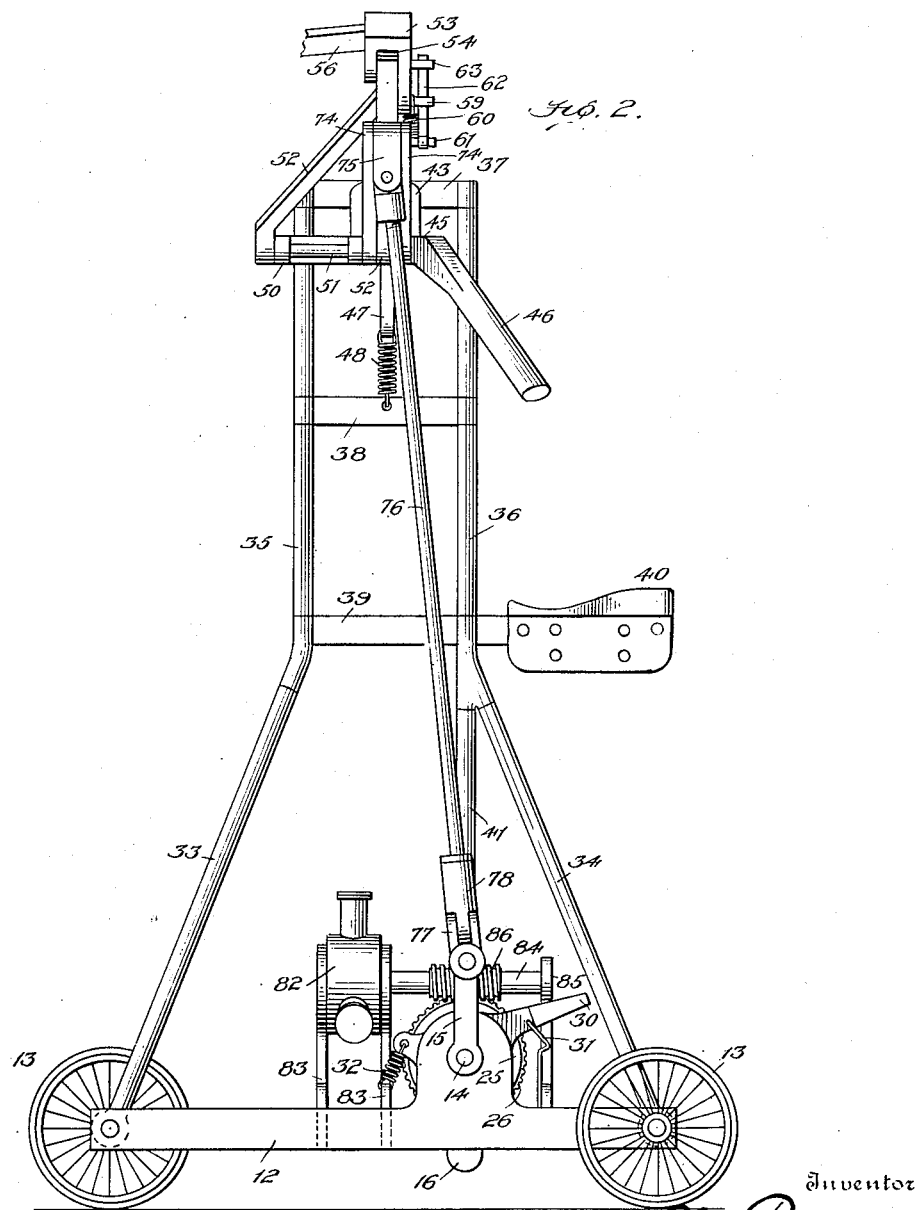

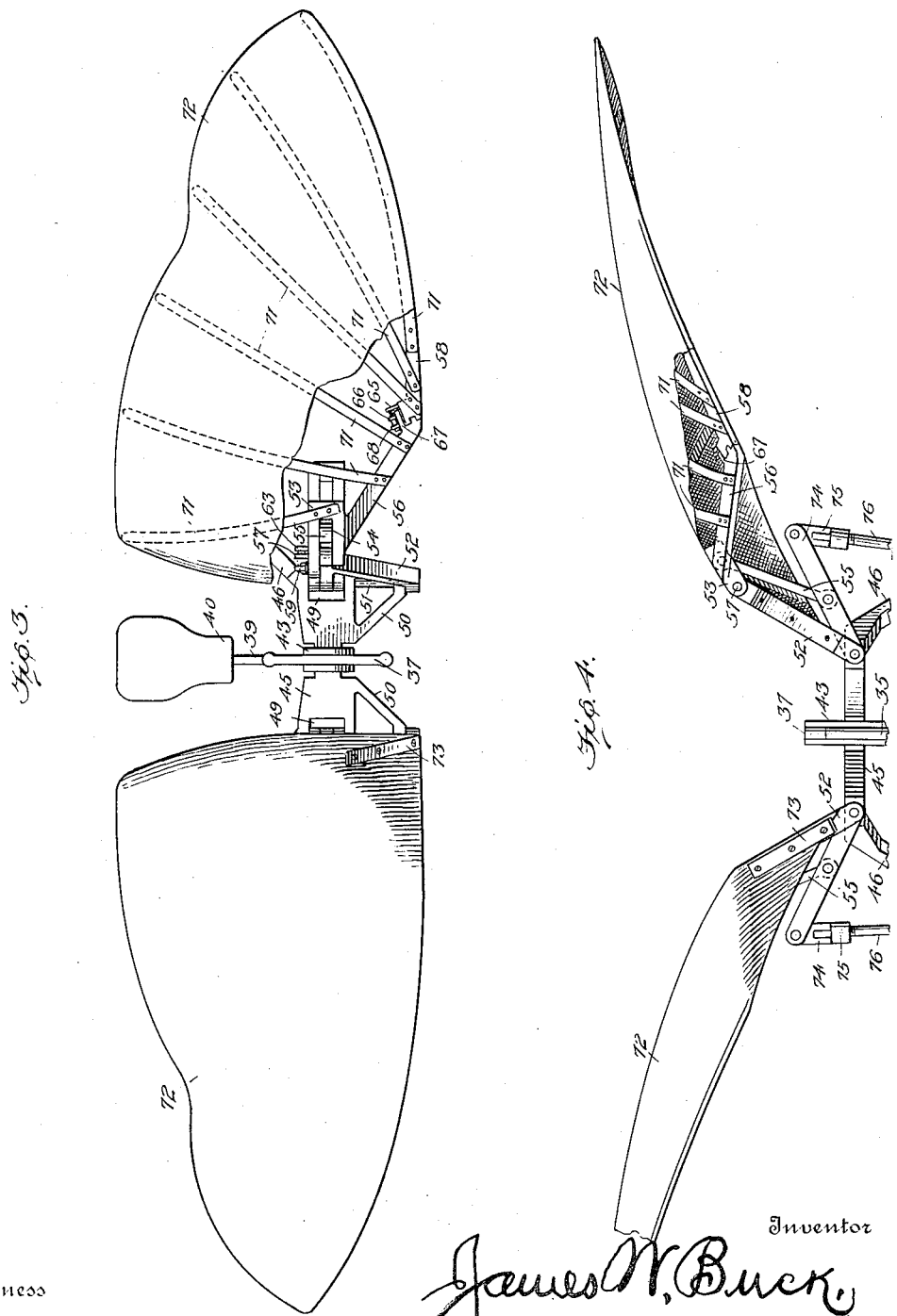

Apr. 3, 1923.

J. W. BUCK 1,450,480

MECHANICAL BIRD

Original Filed Oct. 23, 1918    5 sheets-sheet 4

Witness
Edwin L. Bradford

Inventor
James W Buck

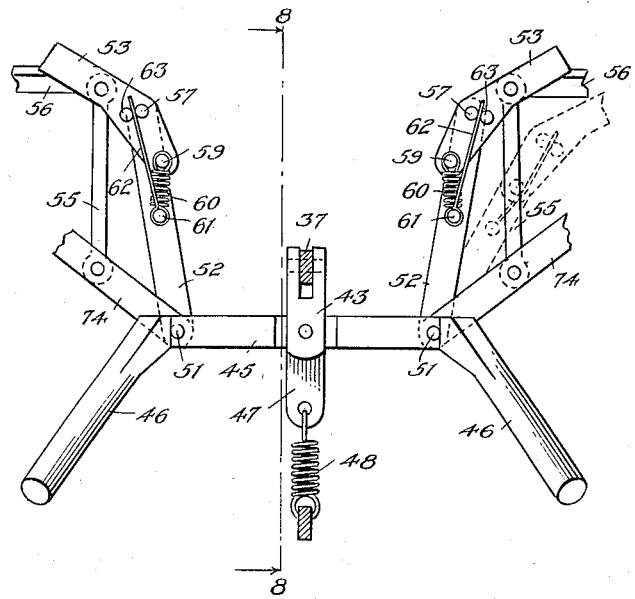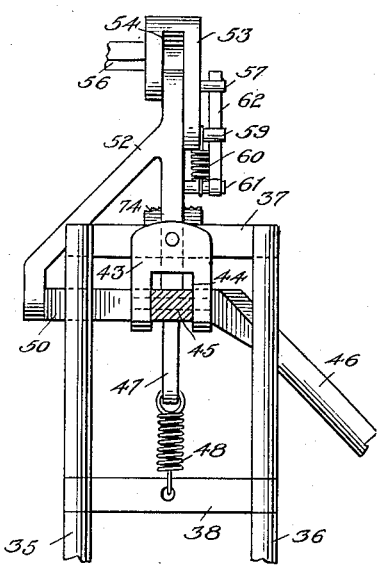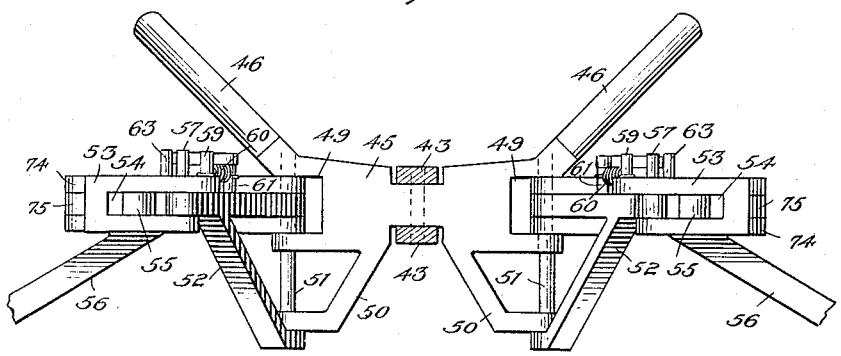

Patented Apr. 3, 1923.

1,450,480

UNITED STATES PATENT OFFICE.

JAMES W. BUCK, OF NEW YORK, N. Y.

MECHANICAL BIRD.

Application filed October 23, 1918, Serial No. 259,333. Renewed August 17, 1922. Serial No. 582,535.

*To all whom it may concern:*

Be it known that I, JAMES W. BUCK, citizen of the United States, and resident of New York, in the county of New York and State of New York, have invented a Mechanical Bird, of which the following is a specification.

My invention relates to flying and it consists primarily in a mechanical bird constructed in such manner as to imitate birds flying; also actuating means interposed between the wings and a power, either motor power, means for foot power or both; also means for directing the course of the bird; also means for yieldingly holding down the wings so that when the weight of the entire structure including the operator is sustained thereby upon the air, they are flapped with as little power as though they carried no weight; also a clutch for connecting and disconnecting the motor; also various devices and combinations of devices hereinafter described and pointed out in the claims.

In the accompanying drawings which form part of this application for Letters Patent, and whereon corresponding reference characters indicate the same parts in the several views:

Figure 1 is a front view of the mechanical bird;

Figure 2 is a side view;

Figure 3 is a plan view of the wings; one of which is broken away to show their construction;

Figure 4 is a front view of the wings;

Figure 7 is a rear sectional view of wing operating levers, a dual hand lever for directing the course of the bird, and spring restrained wing-joints;

Figure 8 is a sectional view taken on the line 8—8 of Figure 7 looking in the direction indicated by arrows;

Figure 9 is a plan view of the parts shown by Figure 7;

Figure 10 is a fragmentary plan view of an outer spring-restrained wing-joint;

Figure 11 is a rear view of parts shown by Figure 10;

Figure 5:
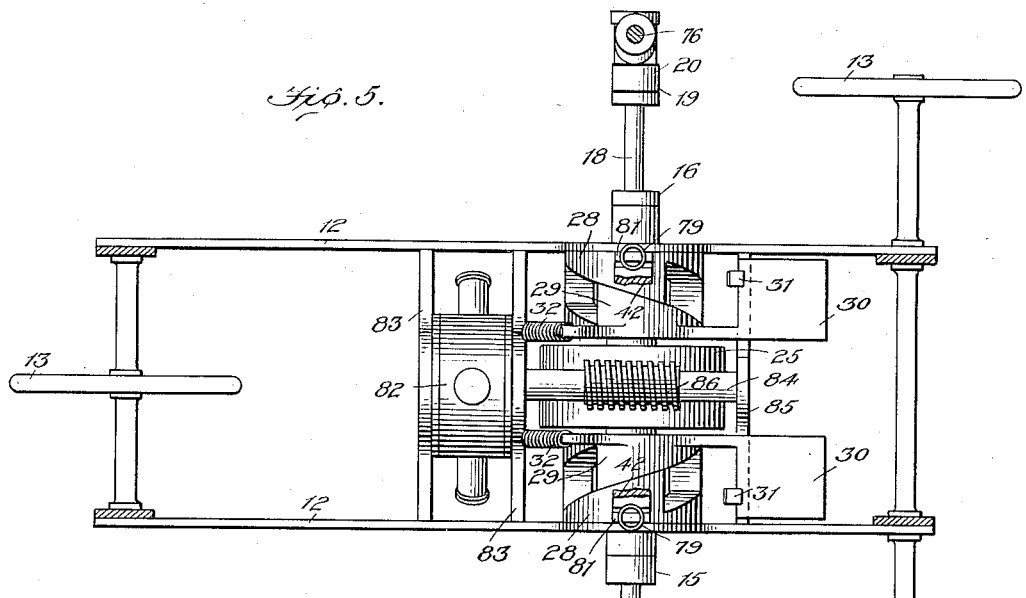
Figure 5 is a plan view of the chassis, the motor and clutch mechanism.

Reference being had to the drawings and numerals thereon, 12 indicates the chassis of the structure, made of metal or other suitable material, and mounted upon suitable wheels 13. Journalled upon opposite sides of the chassis slightly above the horizontal plane thereof is a transverse crankshaft and clutch shaft combined 14, having oppositely disposed cranks 15, 16 terminating in pedals 17 and 18 respectively; while projecting from and parallel with the cranks is a rigid double crank 19 terminating in a horizontal wrist-pin 20 for purposes which will later appear.

Figure 6:
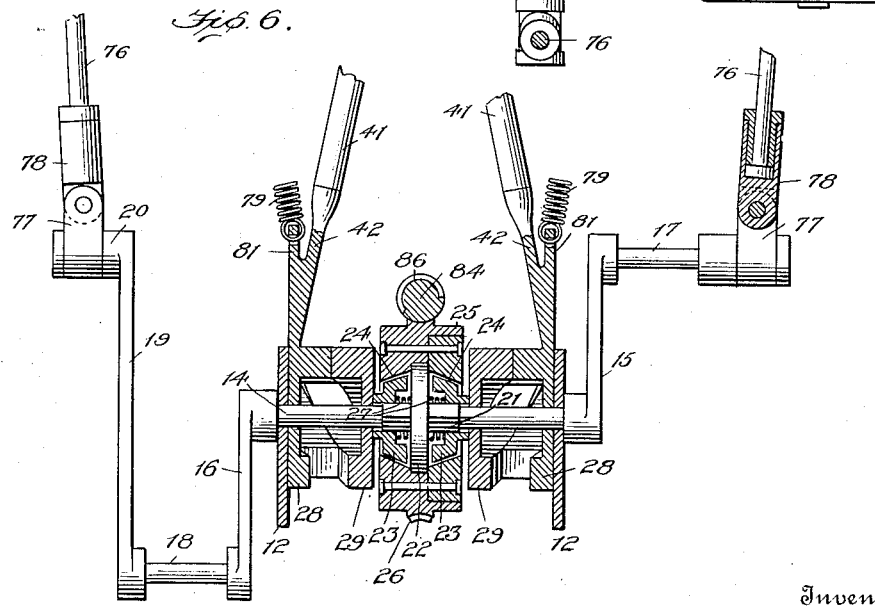
Figure 6 is an end view of a double crank shaft, and a longitudinal sectional view of a double clutch mechanism mounted thereon.

The said shaft 14 for a short distance upon either side of its center is squared as at 21, and centrally mounted thereon in fixed relation is a supporting disk 22, as best shown by Figure 6. Upon each side of disk 22 are circular clutch blocks 23,—23 having squared bearings adapted to reciprocate laterally upon the squared portion 21 of said shaft and also having oppositely beveled outer peripheries adapted to engage at times in frictional contact with mating surfaces 24—24 upon the interior of a two-part gear-casing 25, the latter mounted to rotate loosely upon its supporting disk 22 as aforesaid, and bearing upon its exterior a worm gear wheel 26 by which it may be power driven, as will appear. Surrounding the squared central portion of shaft 14, upon both sides of the disk 22 are compression springs 27,—27, the same being there interposed between said disk and each of the clutch wheels 23,—23 for the purpose of normally forcing the latter outward and into frictional contact with the frictional surfaces 24,—24 upon the interior of casing 25.

Mounted loosely upon opposite ends of shaft 14 just within the confines of chassis 12 are relatively fixed plain supporting blocks 28,—28 inner cam faces contracting at all times with the outer faces of a pair of cams 29,—29 arranged to turn freely about said shaft 14, and when so turned to force both clutch wheels 23,—23 inwardly against their respective springs 27 thereby disengaging them from the interior of the gear casing 25 and rendering the clutch inoperative while so disengaged.

As a means of rocking the cams 29,—29 for the purpose stated, they are each equipped with a rearwardly extending foot pedal 30, there being also latch springs 31,—31 to hold them down when the clutch is off and tension springs 32,—32 at the opposite side of shaft 14 to hold them up when the clutch is connected.

Rising from the corners of the chassis 12 is a rigid frame, preferably of light tubular form, comprising front and back members 33 and 34, respectively, both converging inwardly and terminating in upward parallel extensions 35 and 36 located in the lateral and longitudinal center of the structure, and rigidly connected by horizontal braces 37,—38 and 39, as best shown by Figure 2; the last mentioned extending rearwardly and serving as the support for a vertically and horizontally adjustable operator's seat 40. While depending from the said rear extension 36, immediately below the lowermost brace 39, there is a laterally bifurcated hanger 41 securely connected at its lower ends to one fork 42 of each supporting block 28 aforesaid, where it serves as an intermediate hanger support for chassis 12 and the weight carried thereby.

Straddling the uppermost brace 37 is a depending forked rocking block 43 pivotally connected to said brace, so that it may freely partake of a fore and aft oscillatory movement. This block is slotted or again forked as at 44 in a right angular direction and in this latter slot is pivoted a laterally extending dual-lever bar 45 which is thus accorded a universal rocking movement, and terminates at each end in rigid angularly disposed dual lever handles 46,—46 for directing the course of the bird, as best shown by Figures 7, 8 and 9. And, it will be noted, that a rigid projection or arm 47, depending centrally from the aforesaid dual lever bar 45 is yieldingly connected to the intermediate frame-brace 38 by agency of a tension spring 48, for the purpose of yieldingly retaining said bar 45 and depending parts, in their respective positions.

The ends of said bar 45 are slotted as at 49 and formed with integral forwardly extending arms 50 upon each side of its center serving as extended bearings for main wing pivots 51, upon each of which is pivotally mounted one of the sustaining and propelling wings now to as described.

Of these wings there are two, one right and one left, counterparts of each other, and being counterparts a description of one will suffice for both. They each contemplate and include a jointed and peculiarly flexible wing-frame of skeleton form and of any approved light weight material, so apportioned jointed and arranged as to imitate the wings of birds in flying.

Upon the main wing-pivot 51, carried by the ends of dual lever bar 45, is mounted a primary wing-frame member 52, bifurcated at its lower end to afford an extended bearing. To the upper converging end of said wing-frame member 52 is pivoted a secondary or intermediate member 53, slotted longitudinally as at 54 to straddle the end of said primary member, as shown, and also to receive in pivotal relation a depending link 55 which latter assists in articulating the wing and said intermediate member 53 also carries a forward, outward and downwardly positioned extension 56.

The said extension 56 is pivotally connected at its extremity with an outermost wing-frame member 58 as shown in Figures 10 and 11 causing an upward, a downward and a twisting movement at the tip of the wing as will appear in a description of operation to follow:

Extending beyond its pivotal connection 57 the secondary or intermediate wing-frame member 53 is yieldingly connected as at 59, with said primary member 52, by means of a coil tension spring 60 designed and adapted to retain these elements in proper working relation, and at the same time to permit a relative flexing thereof with each flap of the wing. In addition to said coil spring 60 there is mounted upon the member 52 at 61 an outwardly projecting leaf-spring 62 the outer end of which is interposed between the projecting pintle 57 and a stud 63 similarly projecting from the face of the member 53, and adapted to be engaged at times by the projecting end of pivot stud 59 for the purpose of a cushion stop when the wing-frame members 52 and 53 are flexed as aforesaid.

Similarly and for like reasons, there is interposed between the intermediate wing-frame member 56 and the outer wing-frame member 58 a coil spring 64 extending from its supporting pintle 65 on the wing-frame member 58 to a similar pintle 66 protruding from projection 67 on one side of the secondary wing-frame member 56. These two members 56 and 58 are pivotally connected by agency of a through-pin 68 which, like the pintle 65 and 66, projects to one side as shown by Figure 10 and it will be particularly noted that said through pin 68 is positioned and arranged obliquely to pintle 57 by which the inner wing joint is effected. In this secondary or outermost wing-joint, as in the primary or inner wing-joint, there is also provided a cushion stop, leaf spring 69 extending from pintle 65 passed pintles 66 and 68, where its outer end rests between the latter and an additional pintle 70.

Radiating rearwardly and lateraly from the leading to the trailing edges and tip of the wing structure is a series of convex relatively stiff flexible wing ribs 71, the same being firmly secured at their advance or leading ends to the secondary and the outermost wing-frame members 56 and 58. While over all of said ribs and frame members including the bifurcated leading portion of the wing frame member 52, is secured a light weight wing covering 72 of any suitable air-tight flexible and elastic material, the same being finally fastened to the advance face of wing frame member 52 by means of a surface plate 73, as shown by Figures 3 and 4, to produce an artificial and articulating wing suitable concaved from its under side, and possessing in a marked degree the characteristics of a natural bird's wing.

Upon the pivot 51 and within the notched end 49 of the dual lever-bar 45 is mounted an actuating lever 74 slotted longitudinally at both ends to receive the lower end of the link 55 hereinbefore mentioned, and, at its outer end, the upper extremity of a swivel coupling 75 in which is rotatably mounted a pitman rod 76, as best shown by Figures 1 and 4. As stated, the wings and wing structures are duplicates one of the other, and accordingly there is employed an actuating lever 74 and a pitman rod 76 for each wing, each of said rods at its lower end being connected to its respective cranks 15 and 16 by a universal coupling, as indicated by Figure 6 of the drawings, there being employed for this purpose substantially U-shaped stirrups 77, 77 journaled upon the end of the crank 17, and upon the wrist-pin 20, respectively, together with tubular couplings 78, 78 pivotally carried by said stirrups having swiveled therein the lower ends of the pitman rod aforesaid.

The structure, so far as its manual operation is concerned, is completed by a pair of tension springs 79, 79 connected at 80, 80 to the outer ends of both actuating levers 74, 74, and extending thence downwardly to fastening spurs 81, 81 formed upon their respective fixed frame supporting blocks 28 and 28.

Upon chassis 12 is mounted a motor of suitable construction and horse power, diagrammatically shown in the present drawings, and indicated by the numeral 82. This motor is supported as shown by transverse struts 83, 83 connecting opposite sides of the chassis, and is provided with the customary drive shaft 84, projecting backwardly and journaled at its outer end in a bearing 85, as shown by Figures 2 and 5 of the drawings. The said drive shaft 84 is provided with a worm 86 constantly in mesh with the worm gear 26 carried by gear casing 25, the latter being thus rotated when the motor is running, but rotated idly except when the clutch is applied to operatively connect said motor with the sustaining and propelling wing mechanism, and at such times the wings may be wholly power operated, or operated by motor and foot power combined, or alternately.

Whether power operated or manually operated, however, at the beginning of the downward flap, the air pressure beneath the wings automatically causes an outward lateral distension or reach of the entire wing structures, a relative upward and forward movement at their tips, and an automatic twisting of the wings on their longitudinal axes, causing their trailing tips to assume a relatively higher position, maintaining this relation throughout the entire downward flap.

The former movement resulting from the co-operating arrangement and compound action of the articulated trapezium frame members 52, 53, 55 and 74 shown by Figures 1, 4 and 7 of the drawings herein collectively termed the main wing joint; and the latter movement resulting mainly from the angular arrangement of the hinged connection between said main trapezoidal wing joint and the outermost wing-frame member 58. The tension of the springs upon the joints of the wings cause them to have just the reverse action in the upward flap, excepting that the reversal is gradual throughout the entire flap, thus causing the wings to have a lifting power on the upward flap very nearly equal to the downward flap, without which the bird could not fly. Because of the spring of the wings the flap is shorter than it would be if it were a rigid structure, but causing it to maintain throughout both the downward and upward flaps a uniform downward pressure on the air; thus imitating birds' wings.

The foregoing being a description of my invention in one form of embodiment, the best at the present known to me, it should be noted that I do not confine myself to the particular arrangement, combination and relative proportion of parts shown and described, since the same may be variously altered and changed without in the least departing from the principle of my invention, or affecting the results accomplished. As embodied in the present drawings, however, the operation may be briefly stated as follows:

On leaving the ornithon with wheels 13 resting upon the ground a start is made by first opening the throttle (not shown) of motor 82, the controlling clutch being normally disconnected as shown by Figure 6, and the gear casing 25 in the meantime running free under influence of the worm drive 86, 84. Thereupon, an operator seated in the saddle 40 takes hold of the dual hand lever and places his feet upon the clutch pedals 30. Either or both foot pedals 30 now being released by withdrawal of their taining springs 31, rise under influence of the oppositely disposed tension springs 32 to the positions indicated by Figure 2, thereby partially rotating their respective cams 29 laterally outward, and at the same time permitting clutch springs 27 to force the clutch wheels 24 outward into frictional contact with the beveled interior of gear casing 25, which is thus operatively locked to the squared portion 21 of the main driving shaft 14.

This accomplished, power is instantly transmitted from shaft 14 and operative connections to the pitman rods 76, 76, which are reciprocated simultaneously to actuate wings 72 in both directions, regardless of their degree of angularity with reference to the longitudinal or lateral axis of the structure. The wings are now held down by the weight sustaining springs 79, 79 to their lowermost position, and the crank shaft 14 is at lower center, and in a neutral position in relation to the said springs 79, 79, and to start the wings flapping, without having to apply power equal to said springs 79, 79 the clutch is connected, as above described, and disconnected in a manner to start a short flapping of the wings, and increased as the lifting power of the wings is increased by their longer flap, such lifting power being continuous throughout the downward flap and upward flap of the wings, until the weight of the entire structure, including the operator is supported, through said tension springs 79, 79 by the wings upon the air. The weight now being supported by the wings, in this manner gives the wings as free a downward movement as upward, and are flapped with the minimum amount of power. When foot power is applied the clutch pedals 30, 30 are locked down by latch springs 31, 31 and the operator places his feet upon pedals 17 and 18 and starts them with an oscillatory movement, giving a short flap to the wings, and increases their movement until they rotate as above described. Both motor power and foot power may be had at one and the same time by connecting the clutch.

The course of the bird is directed by the course directing dual hand lever hereinbefore described. Tilting of said hand lever downward elevates the front of the wings, causing the bird to go upward, and tilting of said hand lever upward elevates the back of the wings causing the bird to go downward and tilting of said hand lever downward on the right and upward on the left elevates the tip of the right wing and lowers the tip of the left wing causing the bird to turn to the left, and tilting of said hand lever upward on the right and downward on the left lowers the tip of the right wing and elevates the tip of the left wing, causing the bird to turn to the right. And it will be particularly noted that said dual course directing hand lever may be given the full range of its movements, either vertically or horizontally at all times without in the least interrupting or interfering with the flapping of the sustaining and propelling wings 72. When flying, the flapping of the wings may be stopped by disconnecting the clutch; the bird will then sail as a buzzard.

The foregoing being a description of my invention, what I now claim and desire to secure by Letters Patent is:

1. In a mechanical bird the combination with a frame, of a transverse course directing bar carried by said frame and universally movable thereon, oscillating wings pivotally mounted upon said course-directing bar at opposite sides of its supporting frame, and means under control of an operator for oscillating said wings.

2. In a mechanical bird the combination with a frame, of a transverse course directing bar carried by said frame and universally movable thereon, oscillating wings pivotally mounted on said course directing bar at opposite sides of its supporting frame, dual handles for manipulating said course directing bar, and means under control of an operator for oscillating said wings.

3. In a mechanical bird, the combination with a frame, of a transverse course directing bar carried by said frame and universally movable thereon, oscillating wings pivotally mounted on said course directing bar at opposite sides of its supporting frame, a stabilizing spring for yieldingly connecting said course directing bar with a relatively fixed point of attachment for automatically returning it to a normal position, and means for oscillating said wings.

4. In a mechanical bird, the combination with a frame, of a transverse course directing bar carried by said frame and universally movable thereon, oscillating wings pivotally mounted on said course directing bar at opposite sides of its supporting frame, a stabilizing spring yieldingly connecting said course directing bar wth a relatively fixed point of attachment, means for manipulating said course directing bar, and means for oscillating the wings.

5. In a mechanical bird, the combination with a frame, of a transverse course directing bar carried by said frame and universally movable thereon, oscillating wings pivotally mounted upon said course directing bar at opposite sides of its supporting frame, laterally projecting actuating levers each pivotally connected to said course directing bar upon opposite sides of its center and operatively connected to its respective wing, pitman rods connected to said actuating levers for rocking them reversely upon their pivotal supports, and means for reciprocating said rods.

6. In a mechanical bird, the combination with a frame, of a transverse course directing bar carried by said frame and universally movable thereon, oscillating wings pivotally mounted upon said course directing bar at opposite sides of its supporting frame, laterally projecting actuating levers each pivotally connected to said course directing bar upon opposite sides of its center and operatively connected to its respective wing, pitman rods connected to said actuating levers for rocking them reversely upon their pivotal supports, tension springs extending downwardly from the outward end of each actuating lever to a relatively fixed point of support, and means for reciprocating said pitman rods.

7. In a mechanical bird the combination with a frame, of a transverse course directing bar, carried by said frame and universally movable thereon, oscillating wings pivotally mounted upon said course directing bar at opposite sides of its supporting frame, means for flapping said wings, and means for automatically distending said wings in opposite directions laterally at each down flat thereof, and contracting them during each up flap thereof.

8. In a mechanical bird, the combination with a frame, of a transverse course directing bar carried by said frame and universally movable thereon, oscillating wings pivotally mounted upon said course directing bar at opposite sides of its supporting frame, a pitman rod operatively connected to each of said wings for oscillating them reversely, a crank shaft for reciprocating said rods in unison, a motor for driving said shaft, and a clutch interposed between said motor and shaft.

9. An artificial wing including in combination an articulated frame constituting a main wing-joint, an actuating lever for flapping the wing upon said joint, suitable flexible spreaders operatively connected to said frame, and a convex membraneous covering for the wing structure.

10. An artificial wing including in combination primary, secondary and outermost frame members joined by yielding spring connections, flexible spreaders radiating from said frame members, and a membraneous covering for said spreaders.

11. An artificial wing including in combination primary, secondary and outermost frame members hinged together by relatively stiff spring connections, the hinge connecting said secondary and outermost members being arranged obliquely to that employed for connecting said primary and secondary members, flexible spreaders radiating from frame members, and a membraneous covering for said spreaders.

12. An artificial wing including in combination a primary frame member, a secondary frame member pivotally connected to said frame member, an outermost frame member pivotally connected to the secondary member, in a plane at an angle to that occupied by said first pivotal connection, spreaders radiating from the frame members, and a membraneous covering for said spreaders.

13. An artificial wing for mechanical birds including in combination an articulated frame constituting a main wing-joint arranged and adapted to distend the wing laterally at each down flap and contract it during the up flap, a secondary wing-joint yieldingly connected to said main wing-joint, an outermost frame member similarly connected to said secondary wing-joint whereby the wing structure may be twisted on its longitudinal axis when flapped, spreaders carried by the frame members, and a membraneous covering for said spreaders.

Signed at New York, in the county of New York and State of New York, this 22nd day of October, A. D. 1918.

JAMES W. BUCK.

Witnesses:
 CHAS. M. KIEFER,
 LUCY A. CARICATO.